(12) United States Patent
Chu et al.

(10) Patent No.: US 10,223,443 B2
(45) Date of Patent: Mar. 5, 2019

(54) SYSTEM, DEVICE, AND METHOD FOR ADMINISTRATION OF AN ELECTRONIC COMMUNICATIONS DEVICE IN A COMMUNICATIONS NETWORK

(71) Applicant: RingCentral, Inc., Belmont, CA (US)

(72) Inventors: Wanning Chu, Burlingame, CA (US); Brian David Wright, San Mateo, CA (US); Ian Eblovi, Centennial, CO (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/481,064

(22) Filed: Apr. 6, 2017

(65) Prior Publication Data

US 2018/0293305 A1    Oct. 11, 2018

(51) Int. Cl.
*G06F 17/30* (2006.01)
*H04M 1/02* (2006.01)
(Continued)

(52) U.S. Cl.
CPC .. *G06F 17/30702* (2013.01); *G06F 17/30991* (2013.01); *G06K 7/1413* (2013.01); *G06K 7/1447* (2013.01); *G06K 19/06028* (2013.01); *G06K 19/06112* (2013.01); *H04L 67/146* (2013.01); *H04M 1/0202* (2013.01); *H04M 7/006* (2013.01)

(58) Field of Classification Search
CPC ................... G06K 19/06028; G06K 19/06037
See application file for complete search history.

(56) References Cited

U.S. PATENT DOCUMENTS

| 8,271,685 B1 * | 9/2012 | Reeves | H04W 8/265 455/437 |
| 8,397,280 B1 * | 3/2013 | Zhu | H04W 12/06 726/4 |

(Continued)

OTHER PUBLICATIONS

Article entitled "SysAid Barcode Scanner App (iOS) Guide", by SysAid, dated Apr. 13, 2015.*

(Continued)

*Primary Examiner* — Mahesh H Dwivedi
(74) *Attorney, Agent, or Firm* — Finnegan, Henderson, Farabow, Garrett & Dunner LLP (57) ABSTRACT

A computer readable medium configured for use in a mobile device for assigning an electronic communications device to a selected member of an organization. The computer readable medium containing instructions that when executed by at least one processor cause the mobile device to capture an identifier associated with an electronic communications device connectable to a communications network associated with an organization. The instructions also cause the mobile device to access a database including information about a plurality of electronic communications devices that are part of the organization's communications network. The instructions further cause the mobile device to present on a display usage information about the electronic communications device for association of the electronic communications device to a selected member of the organization. Then, the instructions may cause the mobile device to determine at least one value to reflect that the electronic communications device is assigned to the selected member.

21 Claims, 7 Drawing Sheets

(51) Int. Cl.
  *H04L 29/08* (2006.01)
  *G06K 19/06* (2006.01)
  *G06K 7/14* (2006.01)
  *H04M 7/00* (2006.01)

(56) References Cited

U.S. PATENT DOCUMENTS

| | | | |
|---|---|---|---|
| 8,494,581 B2 | 7/2013 | Barbosa et al. | |
| 9,430,575 B2 | 8/2016 | Addy et al. | |
| 9,626,609 B1* | 4/2017 | Ferguson | G06K 19/06037 |
| 2003/0233287 A1* | 12/2003 | Sadler | G06Q 30/02 |
| | | | 705/28 |
| 2005/0145688 A1* | 7/2005 | Milenkovic | G06Q 10/087 |
| | | | 235/375 |
| 2007/0027964 A1 | 2/2007 | Herrod et al. | |
| 2008/0133734 A1* | 6/2008 | Jacobs | H04L 29/06 |
| | | | 709/223 |
| 2008/0228773 A1 | 9/2008 | Stewart et al. | |
| 2009/0063318 A1* | 3/2009 | Alonzo | G06Q 40/00 |
| | | | 705/35 |
| 2010/0123565 A1* | 5/2010 | Kaufman | G07C 5/008 |
| | | | 340/426.24 |
| 2013/0110828 A1* | 5/2013 | Meyerzon | G06F 17/30864 |
| | | | 707/728 |
| 2013/0212117 A1* | 8/2013 | Tyree | G06F 17/30876 |
| | | | 707/756 |
| 2015/0193469 A1* | 7/2015 | Hagiwara | G06F 17/30241 |
| | | | 345/589 |
| 2016/0119301 A1* | 4/2016 | Thilgen | H04L 63/06 |
| | | | 726/1 |
| 2016/0171451 A1* | 6/2016 | Pugh | G06Q 10/1091 |
| | | | 705/7.18 |
| 2016/0337365 A1* | 11/2016 | Beiter | G06F 9/468 |

OTHER PUBLICATIONS

Article entitled "AssetManage Enterprise Getting Started Guide", by AssetManage, Copyright 2016.*
Article entitled "Sage Fixed Assets Tracking User's Guide", by Sage, Copyright 2012.*
Book entitled "IBM System Storage N series Reference Architecture for Virtualized Environments", by IBM, dated Jun. 2014.*
Article entitled "RedBeam Asset Tracking User Manual", by RedBeam, dated Jul. 22, 2010.*

* cited by examiner

SYSTEM, DEVICE, AND METHOD FOR ADMINISTRATION OF AN ELECTRONIC COMMUNICATIONS DEVICE IN A COMMUNICATIONS NETWORK

TECHNICAL FIELD

The present disclosure relates to communications networks and, more particularly, to systems, devices, and methods for administration of an electronic communications device connectable to a communications network associated with an organization.

BACKGROUND

Common types of business phone systems include desk phones, PBX phone systems, a VoIP (or Voice over IP) phone systems, and cloud-based phone systems. Irrespective of the type of business phone system that an organization uses, the ongoing maintenance and management of the business phone systems are tedious and time-consuming for the IT administrators. Every time an employee leaves an organization and every time a new employee is hired, reconfiguration of the employee's phone is required. Moreover, in some organizations, phones have a tendency to disappear and reappear in different locations and the IT administrators spend a significant amount of time on managing phone inventories and locating lost phones.

For these and other reasons, it is desirable to have a solution that addresses the need to seamlessly assign phones to members of an organization and to assist the organization in managing the organization's device inventory.

SUMMARY

In one disclosed embodiment, a computer readable medium configured for use in a mobile device is provided. The computer readable medium containing instructions that when executed by a processor cause the processor to perform steps, including: capturing, using the mobile device, an identifier associated with an electronic communications device connectable to a communications network associated with an organization; accessing a database including information about a plurality of electronic communications devices that are part of the organization's communications network; presenting on a display of the mobile device usage information about the electronic communications device for association of the electronic communications device to a selected member of the organization; and determining at least one value to reflect that the electronic communications device is assigned to the selected member.

In another disclosed embodiment a server for assigning an electronic communications device to a selected member of an organization is provided. The server comprises a network interface, a first database including information associated with a communications network associated with of a first group, a second database including information associated with a communications network associated with a second group, and at least one processor. The at least one processor may be in communication with the network interface, the first database, and the second database. The at least one processor may be configured to receive a request from a mobile device to retrieve usage information about an electronic communications device associated with the first group, wherein the request includes an identifier of the electronic communications device captured by the mobile device. The at least one processor may also be configured to search in the first database for usage information about the electronic communications device and avoid from searching the second database for usage information about the electronic communications device. The at least one processor may further be configured to provide the mobile device with information about the electronic communications device. In response to user selection, the at least one processor may be configured to update at least one value in the first database to reflect that the electronic communications device is currently assigned to a selected member of the first group.

In another disclosed embodiment a mobile device for assigning an electronic communications device to a selected member of an organization is provided. The mobile device comprises an optical sensor for capturing an identifier associated with an electronic communications device connectable to a communications network associated with an organization. The mobile device further comprises a network interface for accessing a database including information about a plurality of electronic communications devices that are part of the organization's communications network. The mobile device also comprises a display for presenting usage information about the electronic communications device for association of the electronic communications device to a selected member of the organization. The mobile device additionally comprises a processing device for determining at least one value to reflect that the electronic communications device is assigned to the selected member.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Reference will now be made in detail to the example embodiments implemented according to the present disclosure, the examples of which are illustrated in the accompanying drawings. Wherever possible the same reference numbers will be used throughout the drawings to refer to the same or like parts.

Figure 1:
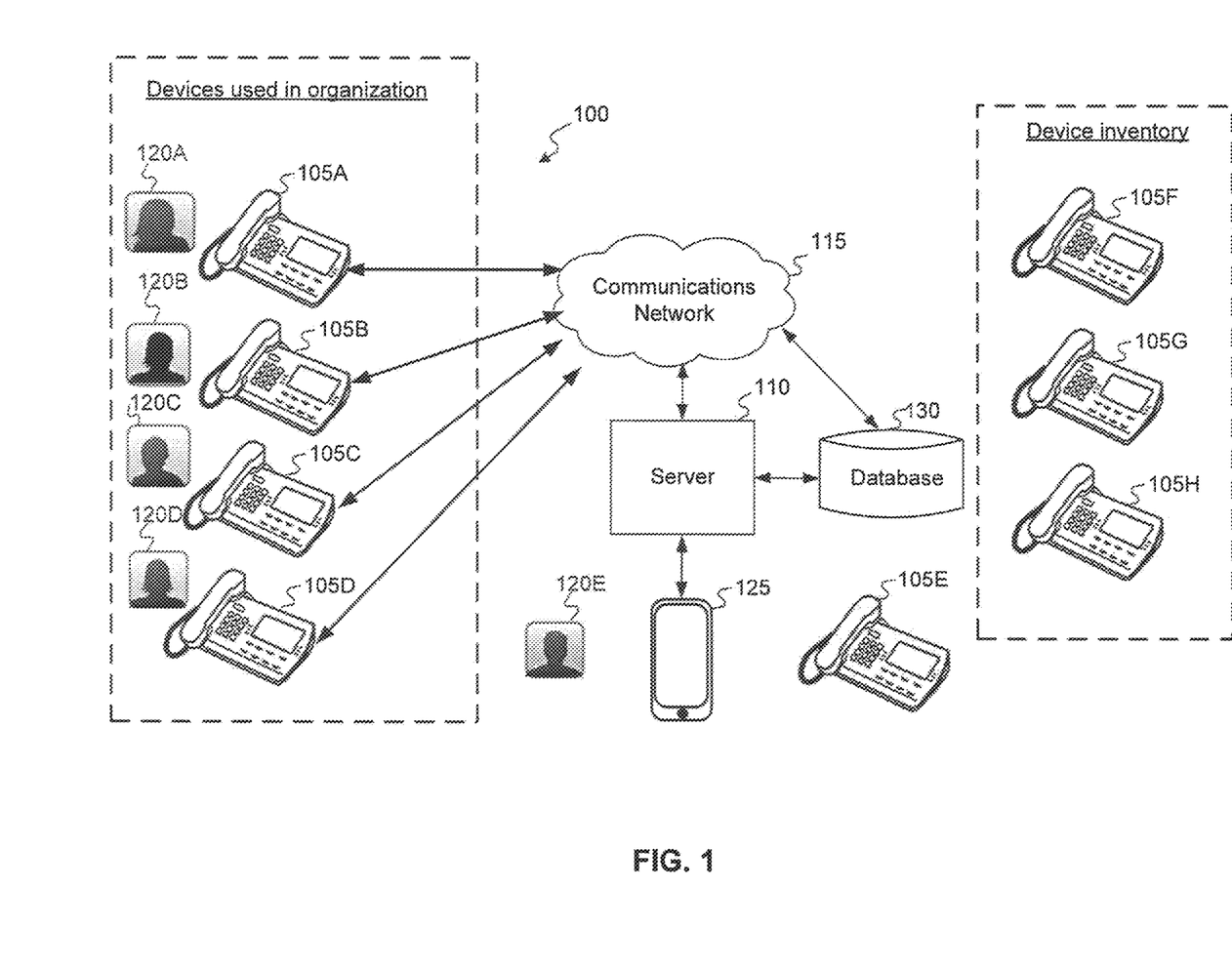
FIG. 1 is a diagram illustrating the assignment of electronic communications devices in an organization using a communications network.

FIG. 1 shows an example of communications system 100 in which various implementations as described herein may be practiced. As shown in FIG. 1, communications system 100 may include a plurality of electronic communications devices 105A-105H (collectively 105) and a server 110 operatively connected to a communications network 115. In one embodiment, server 110 may be communicatively coupled with electronic communications devices 105A-105D and to support communications to members 120A-120D of the organization. In this disclosure, the term "organization" includes any group of people working together, for example, at a company, a corporation, a business, a foundation, a government office, a non-governmental organization, or the like. Moreover, the terms "member of the organization," "user," "subscriber," "participant," and "recipient" may be used interchangeably in the interest of brevity and may refer to any of a variety of entities that may be, for example, a person, an organizational role within an organization, a group within an organization, or the like. In one example, server 110 is a dedicated communications server that enables members 120A-120D to use their associated electronic communications devices 105A-105D and engage in voice or text conversations with other members of the organization and with individuals outside the organization. In another example, server 110 may be part of a system associated with a communication service provider which provides a variety of services such as real-time audio/video conferencing to members 120A-120D of the organization.

Although FIG. 1 depicts a single type of electronic communications device 105, a person skilled in the art would recognize that the term "electronic communications device" refers to any device configured to transmit and receive data by wired or wireless transmission. Electronic communications devices 105 may represent any type of device that is connectable to a communications network associated with organization that enables members of the organization to communicate with other individuals and with server 110. Accordingly, electronic communications devices 105 may include a desk phone, a cordless telephone, a VoIP phone, a fax machine, a cellphone, a smart phone, a computing device, etc. As shown in FIG. 1, electronic communications devices 105A-105D are assigned to members 120A-120D of the organization respectively, and one electronic communications device 105E is currently being assigned to a selected member 120E of the organization using mobile device 125, and other electronic communications devices 105F-105H are held in the organization's inventory and are not assigned to any member. Using mobile device 125 to assign an electronic communications device 105E to selected member 120E of the organization is discussed in greater detail below with reference to FIGS. 4 and 5.

Communications network 115 facilitates communications and sharing of content between electronic communications devices 105, mobile device 125, and server 110 when these components are coupled to the communications network 115. In one embodiment, communications network 115 may be any type of network that provides communications, exchanges information, and/or facilitates the exchange of information between communications network 115 and electronic communications devices 105. For example, communications network 115 may be the Internet, a Local Area Network, a cellular network, a public switched telephone network (PSTN), or other suitable connection(s) that enables communications system 100 to send and receive information between the components of communications system 100. Communications network 115 may support a variety of types of communications and may further support a variety of services and applications for electronic communications devices 105.

In one embodiment, communications system 100 may represent a computer-based system that includes computer system components, desktop computers, workstations, tablets, handheld computing devices, memory devices, and/or internal network(s) connecting the components. Communications system 100 may include or be connected to various network computing resources (e.g., servers, routers, switches, network connections, storage devices, etc.) necessary to support the services provided by communications system 100. For example, server 110 may be coupled to one or more physical or virtual storages such as database 130. Such storages may be a volatile or non-volatile, magnetic, semiconductor, tape, optical, removable, non-removable, or other type of storage device or tangible or non-transitory computer-readable medium. Database 130 may include one or more memory devices that store data and instructions used to perform one or more features of the disclosed embodiments. Database 130 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Consistent with the present disclosure, database 130 may be configured to store information about electronic communications devices that are part of the organization's communications network. In one embodiment, database 130 includes hardware information about all of the electronic communications devices 105. The hardware information may include, for example, the manufacturer and model of the electronic communications devices, a serial number associated with electronic communications device (e.g., International Mobile station Equipment Identities (IMEI), Integrated Circuit Card IDentifier (ICCID), Mobile equipment identifier (MEID), and Secure Element ID Number (SEID), a catalog image associated with the electronic communications devices, and/or general information about the condition of the electronic communications devices. In another embodiment, database 130 may include usage information about electronic communications devices 105. The usage information may include, for example, a phone number, an extension number, a user name, and a user ID number. In addition, database 130 may store historical information related to electronic communications device 105E, for example, to maintain a timeline of members of the organization that were assigned to the electronic communications device. The timeline may be used by the IT administrator of the organization to manage the organization inventory of the electronic communications devices.

The components and arrangements shown in FIG. 1 are not intended to limit the disclosed embodiments, as the system components used to implement the disclosed processes and features can vary. For example, communications system 100 may include multiple servers 110, and each server 110 may host a certain type of communication service, e.g., Voice over Internet Protocol (VoIP) and/or video conferencing, such that various types of multimedia services may be provided to electronic communications devices 105.

Figure 2:
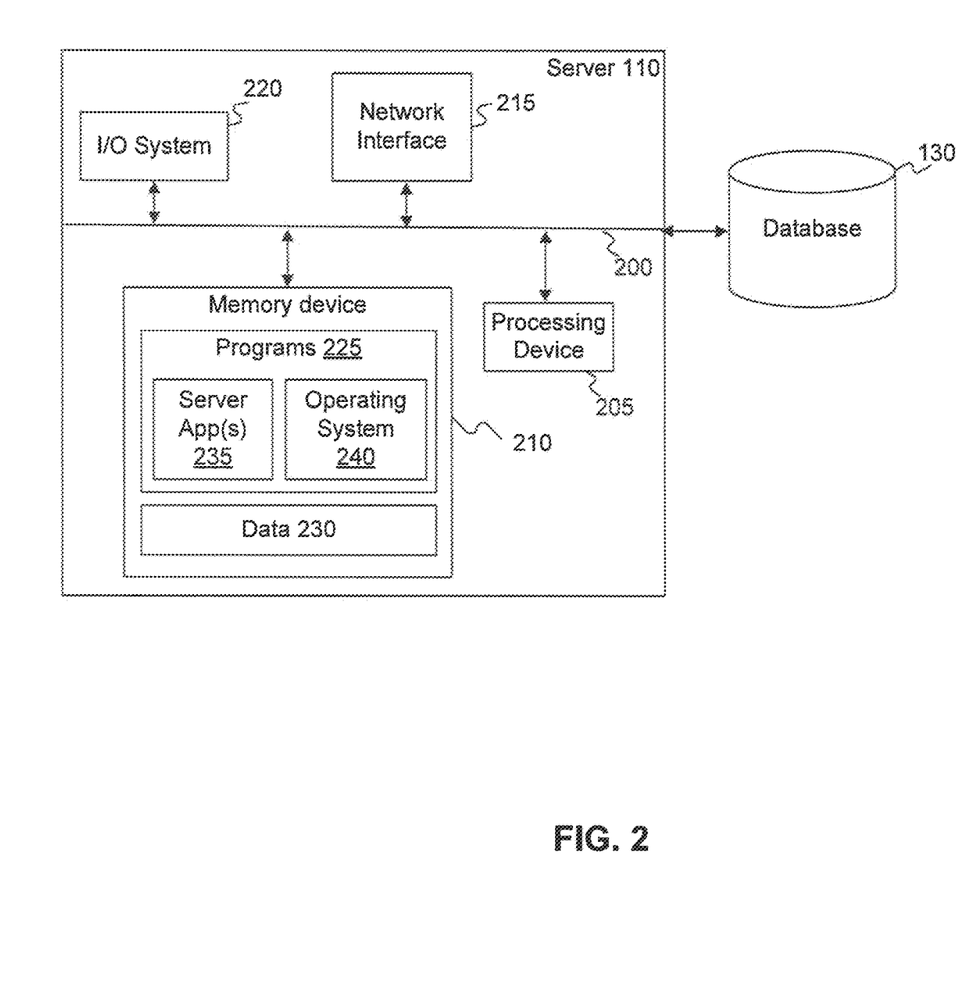
FIG. 2 is a diagram illustrating the components of an example server associated with the communications network of FIG. 1, in accordance with example embodiments of the present disclosure.

FIG. 2 is a diagram of an example server 110 used to manage an organization's communications network (such as, a phone system) and execute other methods to perform embodiments described in the present disclosure. Server 110 includes a bus 200 (or other communication mechanism)

that interconnects subsystems and components for transferring information within server 110. As shown, server 110 includes a processing device 205, a memory device 210, a network interface 215, and an I/O system 220. In some embodiments, server 110 can communicate with an external database such as database 130.

Processing device 205, shown in FIG. 2, may include at least one processor configured to execute computer programs, applications, methods, processes, or other software to perform embodiments described in the present disclosure. The term "processing device" refers to any physical device having an electric circuit that performs a logic operation. For example, the processing device may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™ or manufactured by AMD™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

In some embodiments, the processing device may be associated with a software product stored on a memory device or a non-transitory computer readable medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located at server 110 or at a remote location. A memory device or a computer-readable storage medium can store instructions for execution by the processing device, including instructions for causing the processing device to perform steps consistent with embodiments of the present disclosure herein. Additionally, one or more computer-readable storage mediums can be utilized in implementing a computer-implemented method. The term "computer-readable storage medium" should be understood to include tangible items and exclude carrier waves and transient signals.

In one example, server 110 includes memory device 210 that stores programs 225 and data 230. Programs 225 may include instructions to enable processing device 205 to execute one or more applications, such as server apps 235, operating system 240, and any other type of application or software known to be available on computer systems. Alternatively or additionally, the instructions, application programs, or the like may be stored in database 130 (which can also be internal to server 110) or external storage communicatively coupled with server 110 (not shown) such as one or more databases or memory that may be accessed using communications network 115.

The programs 225 include one or more software modules that when executed by processing device 205 cause processing device 205 to perform one or more functions of the disclosed embodiments. Moreover, processing device 205 may execute one or more programs located remotely from one or more components of the communications system 100. For example, server 110 may access one or more remote programs that, when executed, perform functions related to disclosed embodiments. For example, programs 225 may include server app(s) 225 that can cause processing device 205 to perform one or more functions of the disclosed methods. For example, server app(s) 225 may cause processing device 205 to update at least one value in the database 130 to reflect that the electronic communications device is currently assigned to a selected member of the organization.

Server 110 may implement the methods described herein using customized hard-wired logic, one or more Application Specific Integrated Circuits (ASICs) or Field Programmable Gate Arrays (FPGAs), firmware and/or program logic which in combination with the computer system cause server 110 to be a special-purpose machine. According to one embodiment, the techniques herein are performed by server 110 in response to processing device 205 executing one or more sequences of one or more instructions contained in memory device 210. Such instructions may be read into memory device 210 from another storage medium, such as computer-readable storage medium. Execution of the sequences of instructions contained in memory device 210 causes processing device 205 to perform the process steps described herein. In alternative embodiments, hard-wired circuitry may be used in place of or in combination with software instructions.

In some embodiments, memory device 210 includes programs 225 that may include the operating system 240 performing operating system functions when executed by processing device 205. By way of example, operating system 240 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 240. Server 110 may also include software that, when executed by processing device 205, provides communications with communications network 115 through network interface 215 and/or a direct connection to plurality of electronic communications devices 105.

In other embodiments, memory device 210 includes data 230 storing, for example, hardware information and usage information, as described above, for each electronic communications device of the organization. In some embodiments, server 110 may be communicatively connected to mobile device 125 and one or more remote memory devices (e.g., remote databases, not shown) through communications network 115 or a different network. The remote memory devices can be configured to store part of data 230 that server 110 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Server 110 also includes a network interface 215 coupled to bus 200. Network interface 215 may provide a two-way data communication to a local network, such as communications network 115. For example, network interface 215 may include an integrated services digital network (ISDN) card, cable modem, satellite modem, or a modem to provide a data communication connection to a corresponding type of telephone line. As another example, network interface 215 may include a local area network (LAN) card to provide a data communication connection to a compatible LAN. Wireless links may also be implemented, for example, to communicate with mobile device 125. In any such implementation, network interface 215 sends and receives electrical, electromagnetic or optical signals that carry digital data streams representing various types of information.

In some embodiments, I/O system 220 may include one or more interfaces for receiving signals or input from devices and providing signals or output to one or more devices that allow data to be received and/or transmitted by server 110. For example, server 110 may include interface components for interacting with at least one input device, such as one or more keyboards, pointing devices, or the like, that enables server 110 to receive input from an operator or administrator (not shown).

Figure 3:
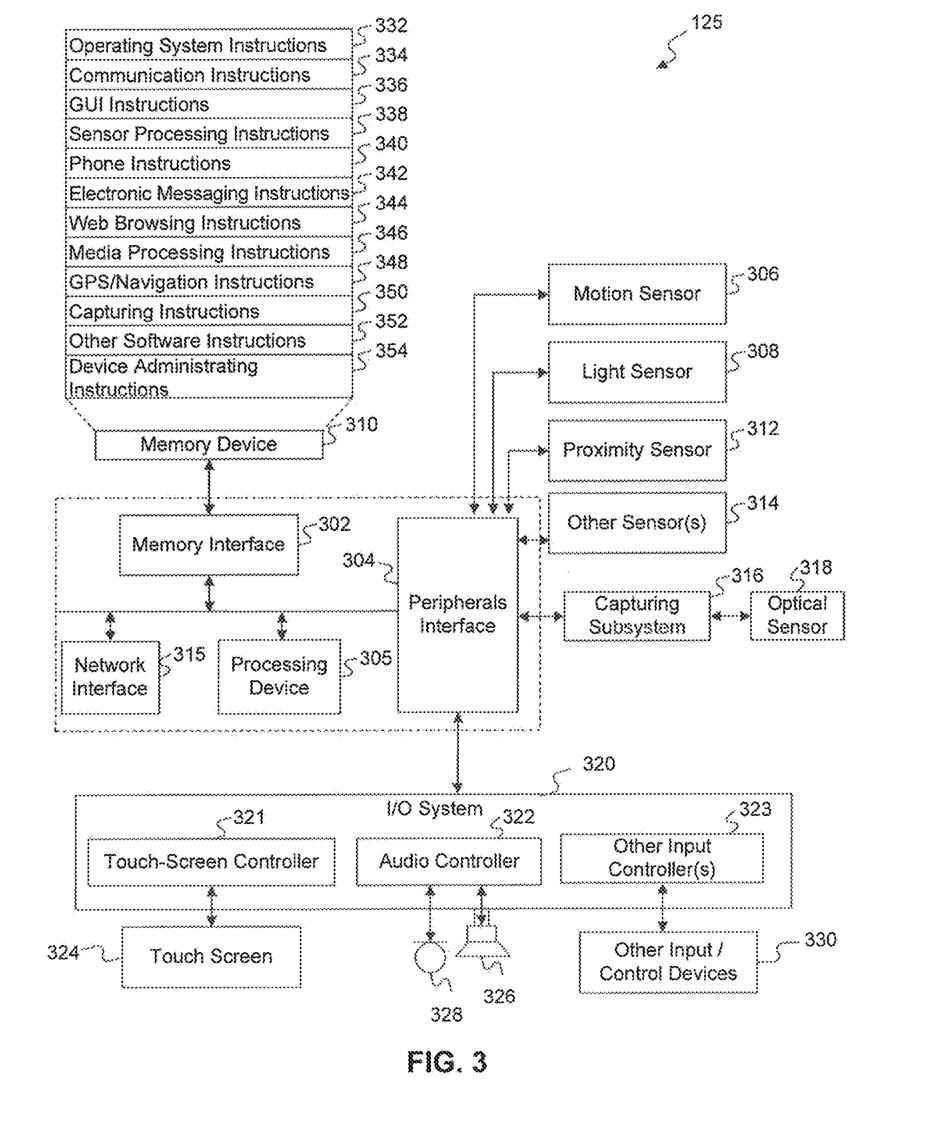
FIG. 3 is a diagram illustrating the components of an example mobile device associated with the communications network of FIG. 1, in accordance with embodiments of the present disclosure.

FIG. 3 is a diagram of an example mobile device 125 used to implement computer programs, applications, methods, processes, or other software to perform embodiments described in the present disclosure. In one embodiment, mobile device 125 may be any device that can wirelessly assign electronic communications device 105E to selected member 120E, for example, a smartphone, a tablet, a mobile station, a personal digital assistant, a laptop, and a dedicated terminal. Consistent with the present disclosure, mobile device 125 includes a processing device 305, a network interface 315, a memory interface 302, and a peripherals interface 304. These components can be separated or can be integrated in one or more integrated circuits. The various components in mobile device 125 can be coupled by one or more communication buses or signal lines. In one example, mobile device 125 may be a dedicated device configured to capture identifiers of electronic communications devices 105 and communicate with server 110 to administer said electronic communications devices to members of the organization. In another example, mobile device 125 may be a commercial off-the-shelf smartphone adapted to administer electronic communications devices in the organization.

Sensors, devices, and subsystems can be coupled to the peripherals interface 304 to facilitate multiple functionalities. For example, a motion sensor 306, a light sensor 308, and a proximity sensor 312 can be coupled to the peripherals interface 304 to facilitate orientation, lighting, and proximity functions. Other sensors 314 can also be connected to the peripherals interface 304, such as a positioning system (e.g., GPS receiver), a temperature sensor, a biometric sensor, or other sensing device, to facilitate related functionalities. A GPS receiver can be integrated with, or connected to, mobile device 125. For example, a GPS receiver can be built into mobile telephones, such as smartphone devices. GPS software allows mobile telephones to use an internal or external GPS receiver (e.g., connecting via a serial port or Bluetooth). A capturing subsystem 316 and an optical sensor 318, e.g., a charged coupled device (CCD) or a complementary metal-oxide semiconductor (CMOS) optical sensor, may be utilized to facilitate capturing functions, such as scanning a code visibly printed on electronic communications devices 105E and recording image representing at least a portion of electronic communications devices 105E.

Communication functions may be facilitated through network interface 315, which may be an Ethernet port connected to radio frequency receivers and transmitters and/or optical (e.g., infrared) receivers and transmitters. The specific design and implementation of network interface 315 depends on the communications network(s) over which mobile device 125 is intended to operate. For example, in some embodiments, mobile device 125 includes network interface 315 designed to operate over a GSM network, a GPRS network, an EDGE network, a Wi-Fi or WiMax network, and a Bluetooth® network.

I/O system 320 may include a touch screen controller 321, audio controller 322, and/or other input controller(s) 323. Touch screen controller 321 is coupled to a touch screen 324. Touch screen 324 and touch screen controller 321 can, for example, detect contact, movement or break thereof using any of a plurality of touch sensitivity technologies, including but not limited to capacitive, resistive, infrared, and surface acoustic wave technologies as well as other proximity sensor arrays or other elements for determining one or more points of contact with the touch screen 324. Touch screen 324 can also, for example, be used to implement virtual or soft buttons and/or a keyboard. While a touch screen 324 is shown in FIG. 3, I/O system 320 may include a display screen (e.g., CRT or LCD) in place of touch screen 324.

Audio controller 322 may be coupled to a speaker 326 and a microphone 328 to facilitate voice-enabled functions such as voice recognition, voice replication, digital recording, and telephony functions. The other input controller(s) 323 may be coupled to other input/control devices 330 such as one or more buttons, rocker switches, thumb-wheel, infrared port, USB port, and/or a pointer device such as a stylus.

Memory interface 302 may be coupled to a memory device 310. Memory device 310 may include high-speed random access memory and/or non-volatile memory such as one or more magnetic disk storage devices, one or more optical storage devices, and/or flash memory (e.g., NAND, NOR). Memory device 310 may store an operating system 332, such as DARWIN, RTXC, LINUX, iOS, UNIX, OS X, WINDOWS, or an embedded operating system such as VXWorkS. The operating system 332 can include instructions for handling basic system services and for performing hardware dependent tasks. In some implementations, the operating system 332 can be a kernel (e.g., UNIX kernel).

Memory device 310 may also store communication instructions 334 to facilitate communicating with one or more additional devices, one or more computers and/or one or more servers. The memory device 310 can include graphical user interface instructions 336 to facilitate graphic user interface processing; sensor processing instructions 338 to facilitate sensor-related processing and functions; phone instructions 340 to facilitate phone-related processes and functions; electronic communications devices 105 messaging instructions 342 to facilitate electronic-messaging related processes and functions; web browsing instructions 344 to facilitate web browsing-related processes and functions; media processing instructions 346 to facilitate media processing-related processes and functions; GPS/navigation instructions 348 to facilitate GPS and navigation-related processes and instructions; capturing instructions 350 to facilitate processes and functions related to capturing subsystem 315; and/or other software instructions 352 to facilitate other processes and functions. Memory device 310 may also include device administrating instructions 354 to facilitate a process for association of an electronic communications device (e.g., electronic communications device 105E depicted in FIG. 1) to a member of the organization (e.g., member 120E depicted in FIG. 1). Example processes are described below with reference to FIGS. 4 and 5.

In some embodiments, mobile device 125 includes software applications having instructions to facilitate connection with server 110 and/or database 130 and access or use of information about the organization's electronic communications device. Graphical user interface instructions 336 may include a software program that enables a user associated with mobile device 125 (e.g., an organization's IT administrator) to change the settings of an electronic communications device, for example, to assign the electronic communications device to a new member of the organization. Further, mobile device 125 may include software applications that enable for example, the IT administrator associated with mobile device 125, to perform various actions to manage, administer, or provision electronic communications devices associated with, or owned, or operated by the organization. Some of these actions are illustrated in FIGS. 6A-6F. Consistent with the present discourse, an IT administrator may be one or more individuals responsible for the administration or maintenance of computer hardware and software systems of the organization, including the communications network (such as, a phone system) of the organization. In the context of the present disclosure, IT administration tasks may include, for example, administrating an electronic communications device to a new member of the organization. The process of administrating an electronic communications device to a new member of the organization is described in detail with reference to FIG. 5.

Each of the above identified instructions and applications may correspond to a set of instructions for performing one or more functions described above. These instructions need not be implemented as separate software programs, procedures, or modules. Memory device 310 may include additional instructions or fewer instructions. Furthermore, various functions of mobile device 125 may be implemented in hardware and/or in software, including in one or more signal processing and/or application specific integrated circuits. For example, mobile device 125 may execute an image processing algorithm to recognize an identifier associated with electronic communications device 105E and captured using capturing subsystem 316.

Figure 4:
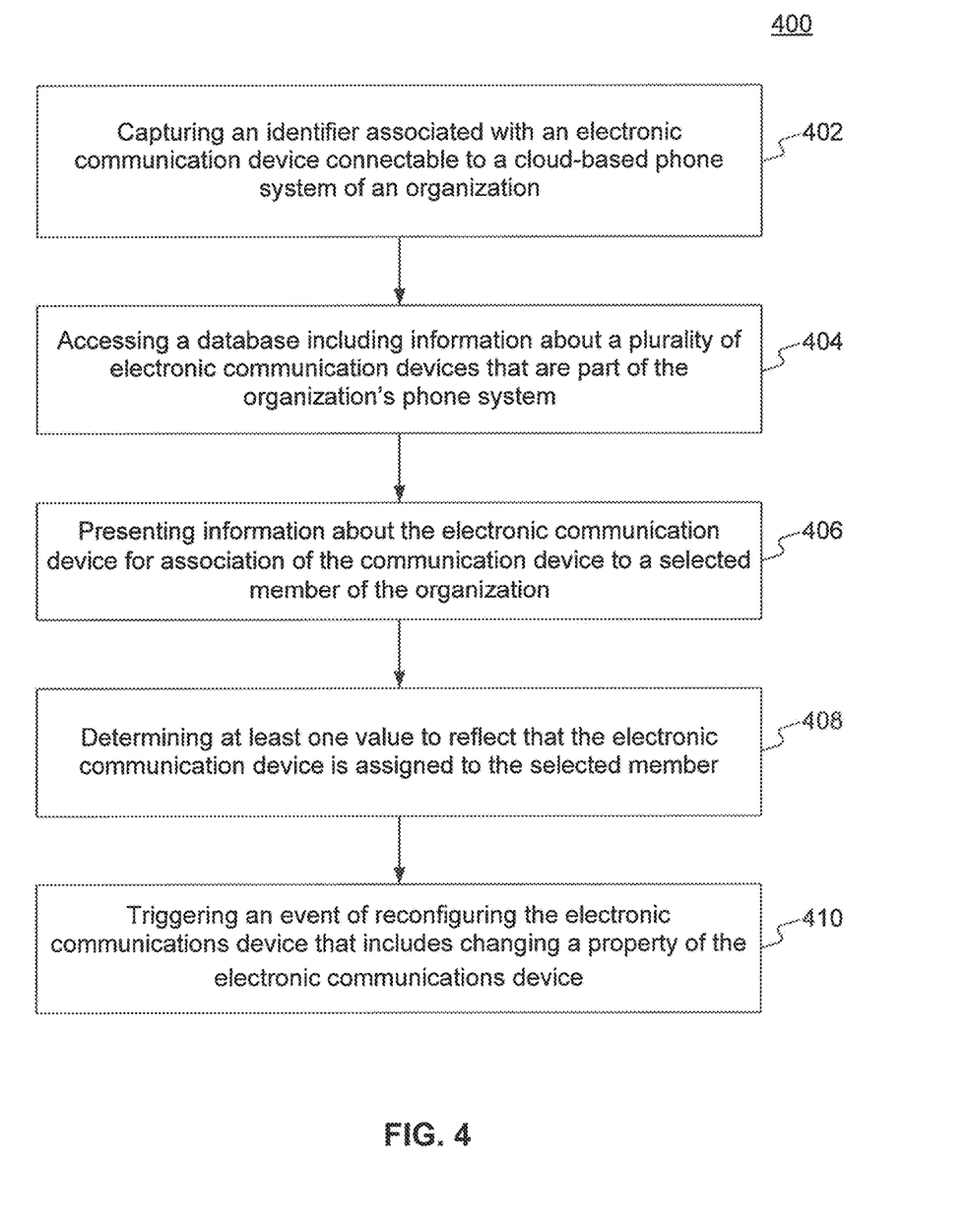
FIG. 4 is a flowchart of an example process for associating an electronic communications device with a member of the organization, in accordance with embodiments of the present disclosure.

FIG. 4 depicts an example process 400 for association of an electronic communications device (e.g., electronic communications device 105E) to a user (e.g., selected member 120E) in a communications network associated with an organization, in accordance with example embodiments of the present disclosure. In one embodiment, all of the steps of process 400 may be performed by mobile device 125. Alternatively, at least some of the steps of process 400 may be performed by a computing device associated with the organization (e.g., a computer of the IT administrator). In the following description, reference is made to certain components of FIGS. 1-3 for purposes of illustration. It will be appreciated, however, that other implementations are possible and that other components may be utilized to implement the example method.

At step 402, mobile device 125 may capture an identifier associated with an electronic communications device. With reference to FIG. 1, mobile device 125 may capture an identifier associated with electronic communications device 105E. The term "identifier" refers to any feature that uniquely identifies the associated electronic communications device for any purposes. In one example, the identifier may include a serial number associated with electronic communications device 105E. The serial number may be a universal product number selected by the manufacturer of electronic communications device 105E. In another example, the identifier may be an ID string associated with electronic communications device 105E. The ID string may include numbers, symbols or characters, and may be selected by the IT administrator of the organization. In one embodiment, step 402 may include scanning a code visibly printed on electronic communications device 105E. The code may be a bar code, a QR code or any other type of graphics that can be visually recognized and/or read by a capturing subsystem 316. In another embodiment, step 402 may include receiving an image representing at least a portion of electronic communications device 105E, and mobile device 125 (or server 110) may execute an image processing algorithm to recognize the identifier.

At step 404, mobile device 125 may access a database including information about the plurality of electronic communications devices that are part of the organization's communications network. With reference to FIG. 1, mobile device 125 may access database 130 that includes information about electronic communications devices 105A-105H. Mobile device 125 may access database 130 using a wireless local area network. In cases where the organization's communications network is a cloud-based phone system, for example, mobile device 125 may access database 130 using an Internet connection. Thereafter, mobile device 125 may retrieve from database 130, based on the recognized identifier, information about electronic communications device 105E. The retrieved information may include hardware information about electronic communications device 105E (e.g., the manufacturer and model of electronic communications device 105E, a serial number associated with the electronic communications device, a catalog image associated with electronic communications device 105E, and general information about the condition of electronic communications device 105E). The retrieved information may also include usage information about electronic communications device 105E (e.g., a phone number assigned to electronic communications device 105E, a member of the organization that is currently assigned to electronic communications device 105E, and more). In one embodiment, mobile device 125 (or server 110) may access database 130 to confirm that the electronic communications device captured is a same electronic communications device described in the information stored in database 130. For example, when all the phones of the organization's communications network are assigned with custom ID numbers. A certain ID number may be used twice. For example, in case a phone was lost or broken and the IT administrator assigned the ID number to another phone but did not update the database, or in case the IT administrator simply made a mistake and marked one phone with sticker with the wrong ID number). This step of accessing database 130 and confirming the information of the captured electronic communications device may minimize human error.

At step 406, mobile device 125 may present on a display (e.g., touch screen 324) information about electronic communications device 105E. In one embodiment, mobile device 125 may present one or more of the following: an image associated with electronic communications device 105E, a manufacturer and model of electronic communications device 105E, a serial number of electronic communications device 105E, indication of the member assigned to electronic communications device 105E, indication of the phone number allocated to electronic communications device 105E, the status of electronic communications device 105E (e.g., online, offline). Examples of the information that may be presented in this step are depicted in FIGS. 6B and 6E. In addition, the mobile device 125 may present a graphical user interface (GUI) on the display that includes different features and buttons to enable the user of mobile device 125 different functionalities associated with the process of administering electronic communications device 105E. For example, mobile device 125 may present a button for changing the phone number of electronic communications device 105E, a button for assigning or reassigning electronic communications device 105E to a member of the organization, a button for resetting electronic communications device 105E, a button for reviewing the usage history of electronic communications device 105E (e.g., a list of members that electronic communications device 105E was previously assigned to), a button for reporting malfunction of electronic communications device 105E, and more.

At step 408, mobile device 125 may determine at least one value to reflect that electronic communications device 105E is assigned to selected member 120E. Consistent with the present disclosure, the determined at least one value may be associated with at least one parameter in database 130 that includes at least one of: a phone number, an extension number, a user name, and a user ID number. The at least one value may be determined based on input selection from the user of mobile device 125 (e.g., selection of a name from a list). In one embodiment, the at least one determined value differs from values of parameters in database 130 associated with other electronic communications devices in the communications network associated with the organization. In other words, each member of the organization may be assigned with an electronic communications device associated with a unique phone number. Moreover, the number of values being determined during the process of administrating electronic communications device 105E may depend on the situation. For example, when selected member 120E is being assigned to an electronic communications device already associated with a phone number, then the only value to be determined may be the user ID of selected member 120E. In another situation, when the communications network associated with the organization is a phone system and selected member 120E is being assigned to a new electronic communications device (i.e., a new phone), mobile device 125 may determine a first value associated with a user name that is a member of the organization, and a second value associated with a phone number allocated to a phone system of the organization. Additional examples of situations that mobile device 125 may be used in regards to electronic communications devices 105 of the organization are described below.

In other embodiments, the determined value may reflect that electronic communications device 105E is currently unassigned. An example of GUI indicating that electronic communications device 105E is currently not assigned to any member of the organization is depicted in FIG. 6B. In addition, the determined value may reflect that electronic communications device 105E is currently assigned to a function in the organization unassociated with any specific member. In one example, the function in the organization may be a common phone (e.g., a phone in a breakroom, a meeting room, and more). In another example, the function in the organization may be a position in the organization (e.g., receptionist, shift manager, and more). In addition, mobile device 125 is configured to store at database 130 a plurality of previous values of electronic communications device 105E to maintain a timeline of members of the organization that were assigned to each of the electronic communications devices 105. The timeline may be used by the IT administrator of the organization to manage the organization inventory of the electronic communications devices.

At step 410, the determination of the at least one value triggers an event, including, for example, configuring electronic communications device 105E. The event may include changing, based on the at least one value, a property of electronic communications device 105E. In one embodiment, the changed property may include a personalization of the display of electronic communications device 105E. For example, upon configuration, electronic communications device 105E may display the name of selected member 120E and/or an ID number associated with selected member 120E. In another embodiment, the changed property may include a list of members to monitor their phone status. For example, electronic communications device 105E may present the presence status (i.e., available, busy, or on-hold) of certain members of the organization. In another embodiment, the changed property may include phone-related features (for example, call waiting settings, message waiting indicator settings, softkeys settings, and more). In another embodiment, the changed property may include network configuration settings (for example, domain name, IP Address, IP address of the Dynamic Host Configuration Protocol (DHCP) server, IP address of a Domain Name System (DNS) server, time zone, and more). An example event of configuring electronic communications device 105E is described with reference to FIG. 5 below. As suggested, the event may involve different or additional operations, including other operations in the system related to electronic communications device 105E or other system devices, including for configuration and operation purposes.

As mentioned above, process 400 may be, at least partially, executed by server 110. For example, server 110 may receive data reflecting the identifier of electronic communications device from mobile device 125, and execute steps 404-408 separate from mobile device 125. This capability enables the organization's IT administrator to remotely configure an electronic communications device. In one instance, one of the employees of the organization may be working abroad. The employee may scan the barcode of a new electronic communications device he/she recently purchased, the scanned identifier may be transmitted to server 110 using a dedicated application, and the organization IT administrator can associate the new electronic communications device to the communications network the organization.

According to another aspect of the disclosure, server 110 may be used to support multiple groups (e.g., different groups of a same organization or different organizations). Server 110 may be operatively connected to a first database 130 and a second database. First database 130 may include information associated with a communications network associated with of a first group and a second database may include information associated with a communications network associated with a second group. In one embodiment, processing device 205 may receive a request from mobile device 125 to retrieve usage information about electronic communications device 105E, wherein the request includes an identifier of electronic communications device 105E captured by mobile device 125. Thereafter, processing device 205 may search in first database 130 for usage information about the electronic communications device and avoid searching second database for usage information about the electronic communications device. As described above and illustrated in FIGS. 6B and 6E, server 110 may provide mobile device 125 with information about electronic communications devices 105. And, in response to user selection, server 110 may update at least one value in the first database 130 to reflect that electronic communications device 105E is currently assigned to a selected member of the first group.

In a related embodiment, the request from mobile device 125 associated with the first group includes an indication that electronic communications device 105E is associated with the second group. For example, a certain organization may administer different phones for its marketing department and for its R&D department. The indicator showing that electronic communications device 105E is associated with the second group may be a colored sticker or a number associated with the identifier. In this embodiment, after detecting the indication that electronic communications device 105E is associated with the second group, processing device 205 may search in the second database for information about electronic communications device 105E. Additionally or alternatively, when the first database 130 does not include information about electronic communications device 105E associated with the captured identifier, processing device 205 may search in the second database 130 for information about electronic communications device 105E.

Figure 5:
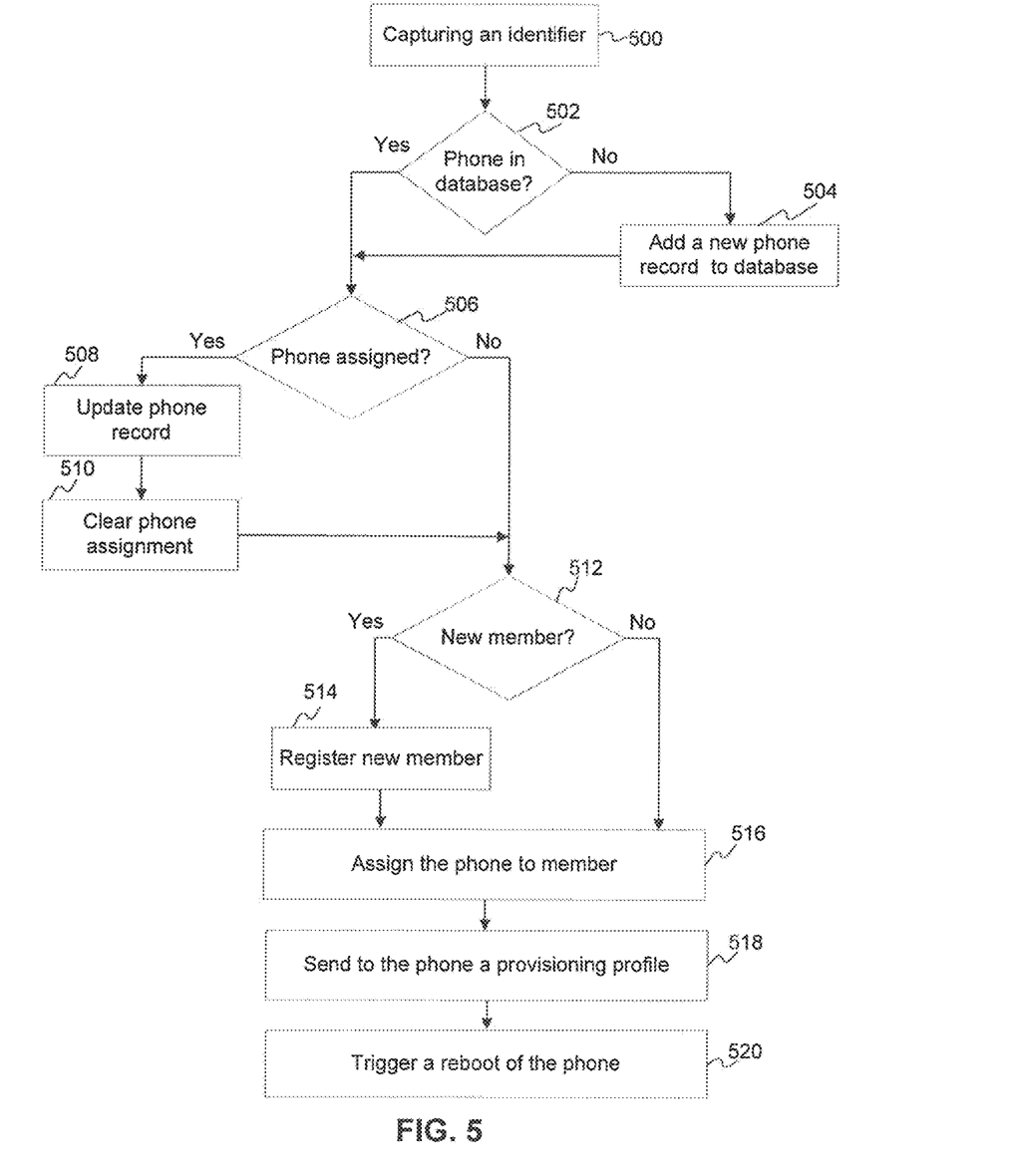
FIG. 5 is a flow diagram of an example process for administrating a device to a new member of the organization, in accordance with embodiments of the present disclosure.

FIG. 5 is a flowchart of an example process according to some embodiments of the present disclosure. The example process describes the procedure that occurs when organization IT administrator uses mobile device 125 to assign or administer electronic communications device 105E from the organization inventory to selected member 120E. The example process in FIG. 5 describes assignment of a phone that is a part of the organization cloud-based phone system. The phone in this instance is one example of an electronic communications device. However, as one skilled in the art would recognize, the same process may be adapted to address assignment of any communications device in or associated with the organization. The process of FIG. 5 begins when mobile device 125 captures an identifier of the phone (block 500). Thereafter, a processing device (e.g., processing device 205 and/or processing device 305) may determine whether information about the phone that is associated with the captured identifier is found in database 130 (decision block 502). If the phone is not found in database 130, the processing device may add a new phone record to database 130 (block 504). An example of GUI indicating that the phone was not found in database 130 is depicted in FIG. 6D. If the phone is found in database 130, the processing device determines whether the phone is already assigned to another member of the organization (decision block 506). If the phone is already assigned to another member of the organization, the processing device may update database 130 (block 508) and clear the phone assignment (block 510). An example of GUI indicating that the phone is already assigned to another member is depicted in FIG. 6E. Updating database 130 enables the processing device to maintain a timeline of members of the organization that were assigned to the phone.

After confirming that the phone is currently unassigned to any member of the organization, the processing device may check if selected member 120E is a new member of the organization (decision block 512). In the context of this embodiment, a new member of the organization is a member that is not registered to the cloud-based phone system, thus not found in database 130. If selected member 120E is indeed a new member or a member that not yet registered to the cloud-based phone system, the organization IT administrator may use mobile device 125 to register selected member 120E to the cloud-based phone system (block 514). Thereafter, the processing device may assign the phone to selected member 120E (block 516). For example, the processing device may update at least one value in database 130 to reflect that the phone is currently assigned to selected member 120E. To complete the admiration process, the processing device may trigger an event of configuring the phone that includes changing one or more properties of the phone. The event of configuring the phone is fully wireless and automated, in one example event of configuring the phone occurs when the organization IT administrator is located remotely from phone. Specifically, the changes in database 130 may come into effect when the processing device sends the phone a provisioning profile associated with selected member 120E (block 518). The provisioning profile may include any type of data that can be used to configure the phone. In one example, the provisioning profile may include the information to present on the display of the phone. Some of these changes may require the phone to restart, therefore, the processing device may trigger a reboot of the phone by sending an automatic reboot command (block 520). After rebooting, the administration process is completed and selected member 120E may use the assigned phone.

FIGS. 6A-6F depict example GUI screen shots of mobile device 125 illustrating different embodiments of the present disclosure. Specifically, the example GUIs depicted in FIGS. 6A-6F illustrate embodiments in which an identifier associated with electronic communications device 105E is captured, information about electronic communications device 105E is presented on a display of mobile device 125, and different options are provided to the user of mobile device 125 for determining at least one value to reflect that electronic communications device 105E is assigned to selected member 120E. The diagrams depicted in FIGS. 6A-6F are illustrative examples only, and are not intended to be limiting.

Figure 6A:
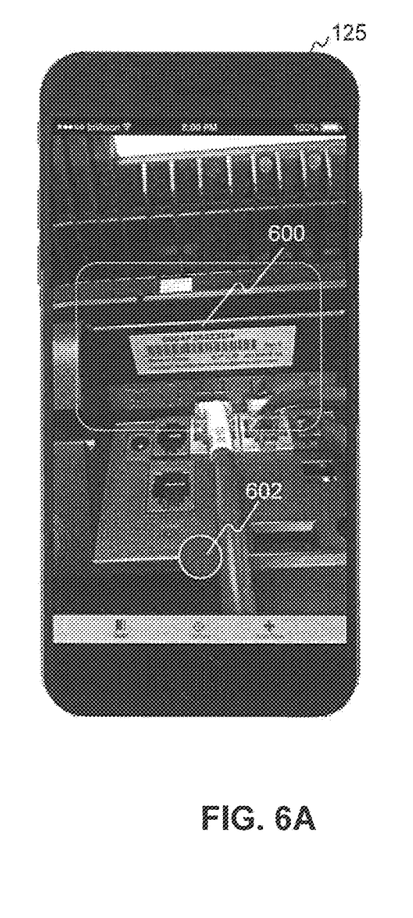
FIGS. 6A-6F are graphical user interface (GUI) screen shots of a mobile device illustrating different embodiments of the present disclosure.
Figure 6B:
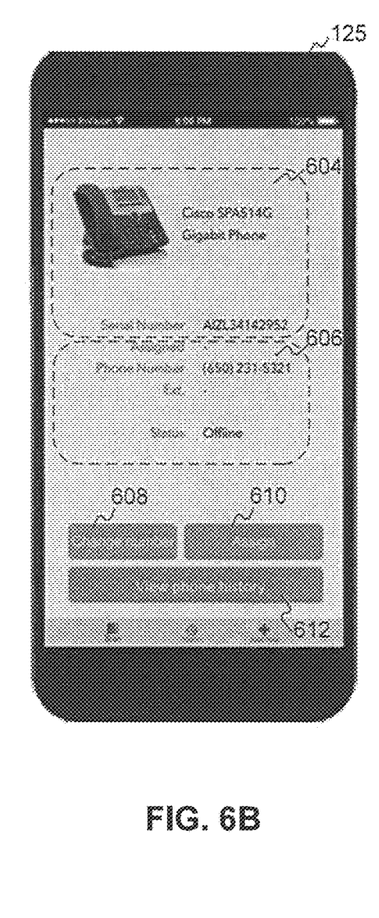

FIG. 6A shows an example GUI displayed on mobile device 125. In this example, mobile device 125 is capturing a portion of electronic communications device 105E. The captured portion includes a label with a barcode 600 associated with the identifier of electronic communications device 105E. In some cases, when the captured image includes two or more codes, the processing device (e.g., processing device 205 and/or processing device 305) may select a code associated with an identifier that confirms with database 130. In addition, mobile device 125 may automatically process any barcode located in front of optical sensor 318, or only after receiving user input by pressing button 602.

FIG. 6B shows another example GUI displayed on mobile device 125. This example GUI may be presented on the display of mobile device 125 after accessing database 130 and finding electronic communications device 105E. The GUI presents hardware information 604 that may include the manufacturer and model of electronic communications device 105E, a catalog image associated with electronic communications device 105E, and the serial number of electronic communications device 105E. The GUI also presents usage information 606 that may include an indication if electronic communications device 105E is not assigned a phone number, an extension number, and a status. The GUI also presents a button 608 for changing the phone number of electronic communications device 105E, a button 610 for assigning electronic communications device 105E to a member of the organization, and a button 612 for reviewing the usage history of electronic communications device 105E (e.g., a list of members that electronic communications device 105E was previously assigned to).

Figure 6C:
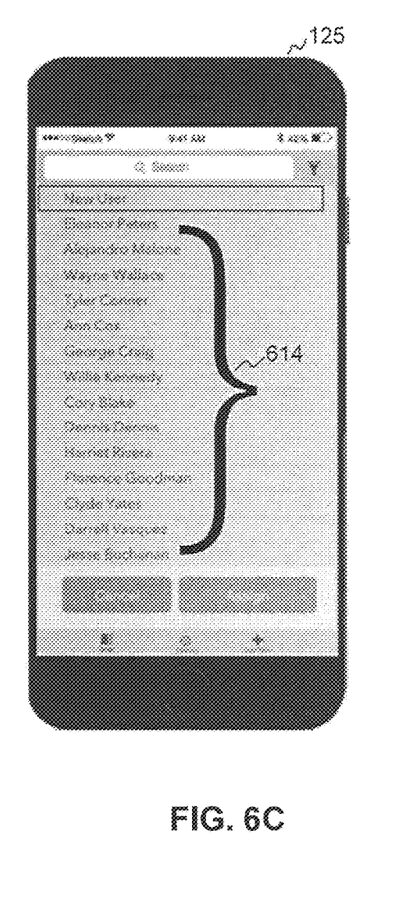
Figure 6D:
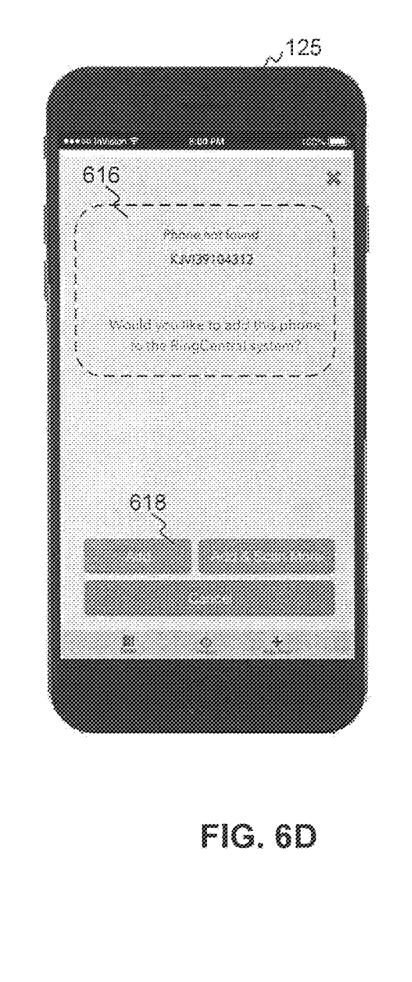
Figure 6E:
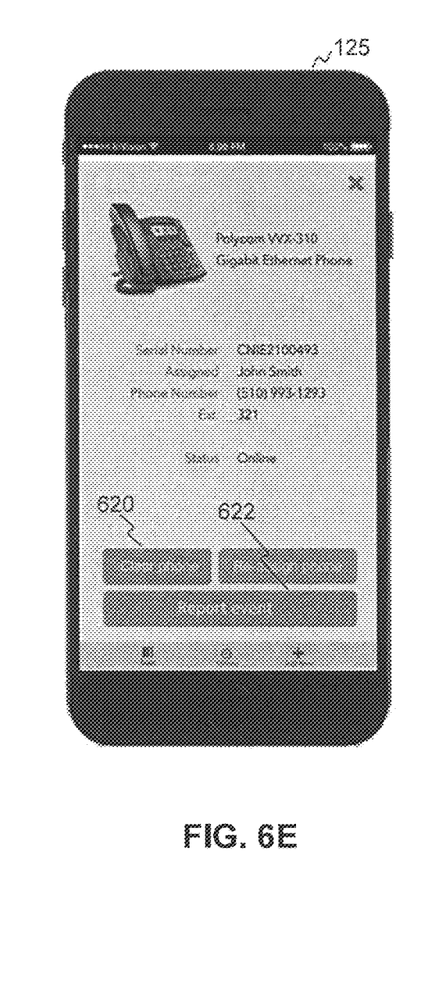

FIG. 6C shows another example GUI displayed on mobile device 125. This example GUI is displayed after the user of mobile device 125 pressed button 610 for assigning electronic communications device 105E. In one embodiment, member 120E is selected out of multiple members of the organization pre-registered to the communications network (e.g., the organization's cloud-based phone system). For example, the GUI presents a list 614 of all the members of the organization that are registered to a cloud-based phone system. Out of this list, the user of mobile device 125 may select the member 120E of the organization which is going to be assigned to electronic communications device 105E. In another embodiment, when selected member 120E is not registered to the communications network, the processing device (e.g., processing device 205 and/or processing device 305) may register the member of the organization to the communications network. The registration procedure may start by pressing the "new user" option in list 614 and may include entering information about the new member.

FIG. 6D shows another example GUI displayed on mobile device 125. This example GUI is an alternative to the GUI depicted in FIG. 6B and may be presented on the display of mobile device 125 after accessing database 130 and not finding electronic communications device 105E. In one embodiment, when database 130 does not include information about an electronic communications device associated with the captured identifier, the processing device (e.g., processing device 205 and/or processing device 305) may update database 130 with information about the electronic communications device associated with the captured identifier. In this case, the GUI presents an indication 616 that this electronic communications device is not found in database 130. Indication 616 may include the identifier captured from electronic communications device 105E. The GUI also presents a button 618 for adding electronic communications device 105E to database 130.

FIG. 6E shows another example GUI displayed on mobile device 125. This example GUI is similar to the GUI depicted in FIG. 6B but in this case electronic communications device 105E is already assigned to a member of the organization. In one embodiment, when a member is leaving the organization, the processing device (e.g., processing device 205 and/or processing device 305) may update database 130 to clear the electronic communications device's assignment to the member that leaves the organization. For example, by pressing a button 620, the IT administrator may update database 130 that electronic communications device 105E should not be assigned anymore to John Smith. Specifically, mobile device 125 may be associated with computer readable medium including instructions configured to access and update database 130 upon pressing button 620. In another embodiment, mobile device 125 may update database 130 with auxiliary information regarding electronic communications device 105E. For example, by pressing a button 622 the IT administrator may update database 130 with a replacement of component (e.g., an earpiece), or a complaint from selected member 120E about electronic communications device 105E, thereby assisting in keeping track on the condition of all the electronic communications devices of the organization.

Figure 6F:
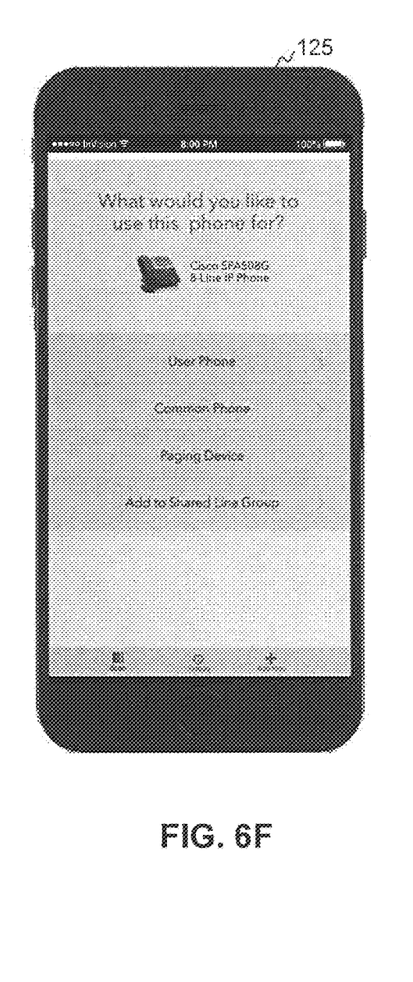

FIG. 6F shows another example GUI displayed on mobile device 125. This example GUI enables the IT administrator to select various functionalities for electronic communications device 105E. For example, the IT administrator may select that electronic communications device 105E may function as a user phone, as a common phone, as a paging phone, and added to a shared line group.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer readable medium configured for use in a mobile device, the non-transitory computer readable medium containing instructions that when executed by a processor cause the processor to perform steps, comprising:

capturing, using the mobile device, an identifier associated with an electronic communications device connectable to a communications network associated with an organization;

accessing a database including information about a plurality of electronic communications devices that are part of the organization's communications network;

retrieving information about the electronic communications device from the database;

confirming that the electronic communications device is the same electronic communications device described by the retrieved information;

presenting, on a display of the mobile device, usage information about the electronic communications device for associating the electronic communications device with a selected member of the organization, wherein network configuration setting data is associated with the selected member;

receiving an instruction to assign the electronic communications device to the selected member, wherein the instruction comprises an identification of the selected member; and updating, based on the instruction, at least one value to reflect that the electronic communications device is assigned to the selected member, wherein the updating triggers (i) changing one or more network configuration setting of the electronic communications device based on the instruction, the at least one updated value, and the network configuration setting data associated with the selected member, and (ii) resetting the electronic communications device.

2. The non-transitory computer readable medium of claim 1, wherein the identifier includes a serial number associated with the electronic communications device.

3. The non-transitory computer readable medium of claim 1, wherein the identifier includes an ID string associated with the electronic communications device.

4. The non-transitory computer readable medium of claim 1, wherein the step of capturing the identifier includes scanning a code visibly printed on the electronic communications device.

5. The non-transitory computer readable medium of claim 1, wherein the step of capturing the identifier includes:
receiving an image representing at least a portion of the electronic communications device; and
executing an image processing algorithm to recognize the identifier.

6. The non-transitory computer readable medium of claim 1, wherein the instructions are configured to cause the processor to further perform steps comprising:
retrieving from the database, based on the identifier, information about the electronic communications device associated with the captured identifier.

7. The non-transitory computer readable medium of claim 1, wherein, when the database does not include information about an electronic communications device associated with the captured identifier, the instructions are configured to cause the processor to further perform steps comprising:
updating the database with information about the electronic communications device associated with the captured identifier.

8. The non-transitory computer readable medium of claim 1, wherein the member is selected out of multiple members of the organization pre-registered to the communications network.

9. The non-transitory computer readable medium of claim 1, wherein, when the member is not registered to the communications network, the instructions are configured to cause the processor to further perform steps comprising:
registering the member of the organization to the communications network.

10. The non-transitory computer readable medium of claim 1, wherein the determined at least one value is associated with at least one parameter in the database that includes at least one of: a phone number, an extension number, a user name, and a user ID number.

11. The non-transitory computer readable medium of claim 1, wherein the instructions are configured to cause the processor to further perform steps comprising:

determining a first value associated with a user name that is a member of the organization; and
determining a second value associated with a phone number allocated to the communications network associated with the organization.

12. The non-transitory computer readable medium of claim 1, wherein the at least one updated value differs from values of parameters in the database associated with other electronic communications devices in the communications network associated with the organization.

13. The non-transitory computer readable medium of claim 1, wherein the instructions are configured to cause the processor to further perform steps comprising:
storing a plurality of previous values of the electronic communications device associated with the captured identifier to maintain a timeline of members of the organization that were assigned to the electronic communications device.

14. The non-transitory computer readable medium of claim 1, wherein the instructions are configured to cause the processor to further perform steps comprising:
determining a value to reflect that the electronic communications device is currently unassigned to any member of the organization.

15. The non-transitory computer readable medium of claim 1, wherein the instructions are configured to cause the processor to further perform steps comprising:
determining a value to reflect that the electronic communications device is currently assigned to a function in the organization unassociated with any specific member.

16. A server for assigning an electronic communications device to a selected member of an organization, the server comprising:
a network interface;
a first database including information associated with a communications network associated with a first group;
a second database including information associated with a communications network associated with a second group; and
at least one processor in communication with the network interface, the first database, and the second database, the at least one processor is configured to:
receive a request from a mobile device to retrieve usage information about an electronic communications device associated with the first group, wherein the request includes an identifier of the electronic communications device captured by the mobile device;
search in the first database for usage information about the electronic communications device;
provide the mobile device with usage information about the electronic communications device;
receive a request from the mobile device to retrieve information about the electronic communications device, wherein the information confirms that the electronic communications device is the same electronic communications device described by the requested information;
search in the first database for information about the electronic communications device;
provide the mobile device with information about the electronic communications device; and
in response to a user selection of a member to whom the electronic communications device is to be assigned, update at least one value in the first database to reflect that the electronic communications device is assigned to the selected member of the first group, wherein network configuration setting data is associated with the selected member, wherein the updating triggers (i) changing one or more network configuration setting of the electronic communications device based on the selection, at least one updated value, and the network configuration setting data associated with the selected member, and (ii) resetting the electronic communications device.

17. The server of claim 16, wherein the first group and second group are part of a same organization.

18. The server of claim 16, wherein the first group is associated with a first organization and the second group is associated with a second organization.

19. The server of claim 16, wherein the request from the mobile device associated with the first group includes an indication that the electronic communications device is associated with the second group, and the at least one processor is further configured to search in the second database for information about the electronic communications device.

20. The server of claim 16, wherein, when the first database does not include information about the electronic communications device associated with the captured identifier, the at least one processor is further configured to search in the second database for information about the electronic communications device.

21. A mobile device for assigning an electronic communications device to a selected member of an organization, the mobile device comprising:

an optical sensor for capturing an identifier associated with an electronic communications device connectable to a communications network associated with an organization;

a network interface for accessing a database including information about a plurality of electronic communications devices that are part of the organization's communications network;

a display for presenting usage information about the electronic communications device for association of the electronic communications device to a selected member of the organization, wherein network configuration setting data is associated with the selected member; and a processing device for:

retrieving information about the electronic communications device from the database, confirming that the electronic communications device is the same electronic communications device described by the retrieved information, receiving an instruction to assign the electronic communications device to the selected member, wherein the instruction comprises an identification of the selected member, and updating at least one value to reflect that the electronic communications device is assigned to the selected member, wherein the updating triggers (i) a configuration event to change, based on the instruction, the at least one value, and the network configuration setting data, one or more network configuration setting of the electronic communications device, and (ii) resetting the electronic communications device.

* * * * *